(12) United States Patent
Ferreri et al.

(10) Patent No.: US 6,681,141 B2
(45) Date of Patent: Jan. 20, 2004

(54) MATERIALS REQUIREMENTS PLANNING SIMULATION ANALYSIS

(75) Inventors: Anthony V. Ferreri, Hyde Park, NY (US); Barun Gupta, Shelton, CT (US); George W. Reiche, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 136 days.

(21) Appl. No.: 09/935,370

(22) Filed: Aug. 23, 2001

(65) Prior Publication Data

US 2003/0040825 A1 Feb. 27, 2003

(51) Int. Cl.[7] .......................... G06F 19/00; G06F 17/60
(52) U.S. Cl. .......................... 700/106; 700/99; 700/107; 705/7; 705/8; 705/28
(58) Field of Search .......................... 700/90, 97, 106, 700/99, 107; 705/7, 8, 28

(56) References Cited

U.S. PATENT DOCUMENTS

| | | | |
|---|---|---|---|
| 4,646,238 A | * | 2/1987 | Carlson et al. ............... 700/95 |
| 5,479,343 A | * | 12/1995 | Matoba et al. .............. 700/106 |
| RE36,360 E | | 10/1999 | Costanza |
| 5,971,585 A | | 10/1999 | Dangat et al. |
| 5,991,732 A | | 11/1999 | Moslares |
| 6,021,396 A | | 2/2000 | Ramaswamy et al. |
| 6,044,361 A | | 3/2000 | Kalagnanam et al. |
| 6,049,742 A | | 4/2000 | Milne et al. |
| 6,094,603 A | | 7/2000 | Ishii |
| 6,119,102 A | | 9/2000 | Rush et al. |
| 6,122,560 A | | 9/2000 | Tsukishima et al. |
| 6,138,103 A | | 10/2000 | Cheng et al. |
| 6,151,582 A | | 11/2000 | Huang et al. |
| 6,216,109 B1 | | 4/2001 | Zweben et al. |
| 6,226,561 B1 | | 5/2001 | Tamaki et al. |

\* cited by examiner

*Primary Examiner*—Leo Picard
*Assistant Examiner*—W. Russell Swindell
(74) *Attorney, Agent, or Firm*—McGinn & Gibb, PLLC; Timothy M. Farrell, Esq.

(57) ABSTRACT

A method and structure for using a materials requirements planning (MRP) tool is disclosed. The invention runs a simulation using a MRP tool for at least one preselected component to produce simulated order levels for a preselected component. The invention then identifies deviations of the simulated order levels from the historical order levels for the preselected component. Next, the invention analyzes the MRP tool to determine whether the deviations are appropriate or are errors. The invention corrects the MRP tool to correct for errors and runs the MRP tool after correcting.

26 Claims, 4 Drawing Sheets

IBM webPUBLISH/CentralESAT                                                                                    Page 1
Dataset: 2001/05/11 02:01:32 = Base(12) - 20010105CPE00          Rpt. Date: 2001-05-21 15:18:13

Pinot: 980         Part: 0000000N7281         Policy: C         Source: A    Z90         Unit Cost: 30.0000
Description: TRAY  Analyzer: 570              Family:

Base 12: 2001/05/11 02:01:32 = 20010105CPE00
Base 11: 2001/04/18 05:08:55 = 20010104CPE001

Percent Diff:  100%      Filter Percent: 90.00      MaxBucket Diff:  9999%

| | | TOTAL | 01/05/28 | 01/07/02 | 01/07/30 | 01/09/03 | 01/10/01 | 01/10/29 |
|---|---|---|---|---|---|---|---|---|
| Base 12 Supply | | 26224 | 0 | 0 | 501 | 1242 | 2964 | 9284 |
| Base 11 | | 240 | 0 | 0 | 0 | 0 | 0 | 0 |
| | DELTA | 25984 | 0 | 0 | 501 | 1242 | 2964 | 9284 |
| Base 12 Demand | | 26314 | 0 | 96 | 625 | 1242 | 2536 | 5513 |
| Base 11 | | 0 | 0 | 0 | 0 | 0 | 0 | 0 |
| | DELTA | 26314 | 0 | 96 | 625 | 1242 | 2536 | 5513 |
| Base 12 0000009P3821 | 980 | 5110 | 0 | 60 | 388 | 823 | 529 | 1946 |
| Base 11 | | 0 | 0 | 0 | 0 | 0 | 0 | 0 |
| | DELTA | 5110 | 0 | 60 | 388 | 823 | 529 | 1946 |
| Base 12 0000009P3824 | 980 | 1961 | 0 | 30 | 194 | 343 | 229 | 705 |
| Base 11 | | 0 | 0 | 0 | 0 | 0 | 0 | 0 |
| | DELTA | 1961 | 0 | 30 | 194 | 343 | 229 | 705 |
| Base 12 7028BT06C1 | 980 | 12012 | 0 | 4 | 26 | 39 | 1162 | 1899 |
| Base 11 | | 0 | 0 | 0 | 0 | 0 | 0 | 0 |
| | DELTA | 12012 | 0 | 4 | 26 | 39 | 1162 | 1899 |
| Base 12 7028BT06E1 | 980 | 7231 | 0 | 2 | 17 | 37 | 516 | 962 |
| Base 11 | | 0 | 0 | 0 | 0 | 0 | 0 | 0 |
| | DELTA | 7231 | 0 | 2 | 17 | 37 | 516 | 962 |

FIG.2

Item Pegged Churn Report

IBM webPUBLISH/CentralESAT                                                                                       Page 2
Dataset: 2001/05/11 02:01:32 = Base(12) – 20010105CPE00                              Rpt. Date: 2001-05-21  15:07:49

Plant: 980           Part: 0000000 P1431      Policy: C       Source: F  980         Unit Cost: 548.5400
Description: CDPOP   Analyzer: 357            Family:

Base 12: 2001/05/11 02:01:32 = 20010105CPE00
Base 11: 2001/04/18 05:08:55 = 20010104CPE001

Percent Diff:   12%      Filter Percent: 90.00         MaxBucket Diff:   9999%

|  |  | TOTAL | 01/05/28 | 01/07/02 | 01/07/30 | 01/09/03 | 01/10/01 | 01/10/29 |
|---|---|---|---|---|---|---|---|---|
| Base 12 Supply |  | 980 | 113 | 129 | 81 | 55 | 60 | 60 |
| Base 11 |  | 863 | 61 | 73 | 73 | 58 | 60 | 60 |
|  | DELTA | 117 | 52 | 56 | 8 | -3 | 0 | 0 |
| Base 12 Demand |  | 981 | 113 | 129 | 81 | 55 | 60 | 60 |
| Base 11 |  | 863 | 61 | 73 | 73 | 58 | 60 | 60 |
|  | DELTA | 118 | 52 | 56 | 8 | -3 | 0 | 0 |
| Base 12 0000000P1431 | 975 | 943 | 105 | 121 | 73 | 47 | 60 | 60 |
| Base 11 |  | 800 | 50 | 62 | 61 | 47 | 60 | 60 |
|  | DELTA | 143 | 55 | 59 | 12 | 0 | 0 | 0 |
| Base 12 7XXXMESMES | 980 | 38 | 8 | 8 | 8 | 8 | 0 | 0 |
| Base 11 |  | 53 | 11 | 11 | 12 | 11 | 0 | 0 |
|  | DELTA | -25 | -3 | -3 | -4 | -3 | 0 | 0 |

FIG. 3

MATERIALS REQUIREMENTS PLANNING SIMULATION ANALYSIS

BACKGROUND OF THE INVENTION

1. Field of the Invention

The present invention generally relates to automated material requirement programs and more particularly to an improved process that performs detail analysis of material requirements for high-level components that deviate significantly from historical trends.

2. Description of the Related Art

Materials requirements planning (MRP) tools are computerized automated applications that provide large corporations with purchasing information. Such MRP applications provide a detailed list of the number of components that the corporation must acquire in order to manufacture its products. The material requirement planning tools are very useful especially in high-technology products, each of which may contain thousands of individual components. Such applications coordinate the component needs for many diverse products, many of which may share components. In addition, such planning tools take into account component inventory and other sources of new and used components at the corporations disposal.

Once the material requirement planning is run, purchasing agents act on the component purchasing reports and place orders accordingly. In addition, many MRP applications place orders with suppliers automatically. Therefore, it is important that the MRP be accurate and free of errors. To insure the accuracy of the MRP, a simulation is often run before the actual MRP is preformed. The "actual" MRP causes orders to be placed, while the simulation does not. The MRP simulation is conventionally checked manually.

However, a problem exists in that the manual checking of the MRP simulation is extremely time intensive and error prone. Therefore, there is a need to automate the checking of the MRP simulation to decrease the consumption of human-resources required with manual checking, and to increase the accuracy and consistency of the checking process. The invention described below addresses these needs and provides an automated system to check the accuracy of the MRP simulation.

SUMMARY OF THE INVENTION

In view of the foregoing and other problems, disadvantages, and drawbacks of the conventional automated purchasing applications the present invention has been devised, and it is an object of the present invention to provide an automated system to check the accuracy of material requirement planning simulations.

In order to attain the objects suggested above, there is provided, according to one aspect of the invention, a method for using a materials requirements planning (MRP) tool which runs a simulation using the MRP tool for at least one preselected component to produce simulated order levels for the preselected component. The invention identifies deviations of the simulated order levels from the historical order levels for the preselected component. The invention then analyzes the MRP tool to determine whether the deviations are appropriate or are errors. Next, the invention corrects the MRP tool to correct for the errors and runs the MRP tool after the correcting is complete.

The invention also identifies high-level components and preferably performs the method only on high-level components. The critical components are components with a cost exceeding a predetermined percentage of the total cost of the product or are components which are uniquely used in a limited number of products. The deviations include a simulated order level that is above or below the historical order levels by at least a predetermined amount. The preselected component includes a plurality of different component and the identifying produces a listing of components that have the deviations. The historical order levels have amounts of the preselected components ordered in previous time periods.

Thus, with the invention, only those components that deviate from their historical purchasing history need to be analyzed manually. In addition, in one embodiment, the invention limits the automatic review to only high-level components. High-level components are those which have a relative cost that exceeds a predetermined percentage of the product being manufactured. Therefore, with the invention, manual analysis only occurs for high-level components that have an abnormal purchasing requirement which deviates significantly from historical purchasing requirements.

BRIEF DESCRIPTION OF THE DRAWINGS

The foregoing and other objects, aspects and advantages will be better understood from the following detailed description of a preferred embodiment(s) of the invention with reference to the drawings, in which:

FIG. 2 is an exemplary chum report according to the invention;

FIG. 3 is an exemplary churn report according to the invention; and

DETAILED DESCRIPTION OF PREFERRED EMBODIMENTS OF THE INVENTION

As mentioned above, it is important to ran and check a simulation of a materials requirements planning tool before orders for components are actually placed with suppliers. This prevents purchasing errors by making sure that the correct amount and mix of components are ordered. However, manually checking the simulation is labor intensive and prone to inconsistencies and errors. In order to address these problems, the invention described below compares the MRP simulation against historical component purchasing requirements. If the purchasing requirements for a given component deviate from the historical requirements for that component by more than a predetermined amount, the invention automatically marks the purchasing requirement for that component as being abnormal.

With the invention, only those components that deviate from their historical purchasing history need to be analyzed manually. In addition, in one embodiment, the invention limits the automatic review to only high-level components. High-level components are those which have a relative cost that exceeds a predetermined percentage of the product being manufactured. Therefore, with the invention, manual analysis only occurs for high-level components that have an abnormal purchasing requirement which deviates significantly from historical purchasing requirements. The invention, which is termed a "peg churn analysis" substantially reduces the employee resources required to check the MRP simulation and increases the consistency and accuracy of checking the simulation. The term "peg churn" comes from the associated higher level components or products ("peg") as well as the component comparison ("churn").

The invention allows the user to quickly see changes in a relatively few high dollar components (e.g., microprocessors in a computer system) that may look suspiciously high or low on their own as well as the changes in the end products that actually use the components (e.g., the different computer models that use a given microprocessor). For example, computer sales could be going up approximately 10% but microprocessor requirements could have gone up 50%. Such a peg churn analysis could quickly show the following problems/explanations. First, multiprocessor systems may have grown at 20% while others may have grown at only 3%, hence the larger processor demand is appropriate and the MRP is not adjusted. Alternatively, a replacement model could have been introduced, but the replaced model could still be on the books, thereby overstating actual processor demand, which would require that the MRP be corrected. Similarly, if there is a bad bill of materials for a particular computer that shows a requirement of 100 processors per computer instead of 1, the MRP would have to be corrected. As an additional example, an input error in the parameters of the MRP run (such as 100% over all growth instead of 10%) could be the cause of the abnormal purchasing change and would require correction of the MRP.

Figure 1:
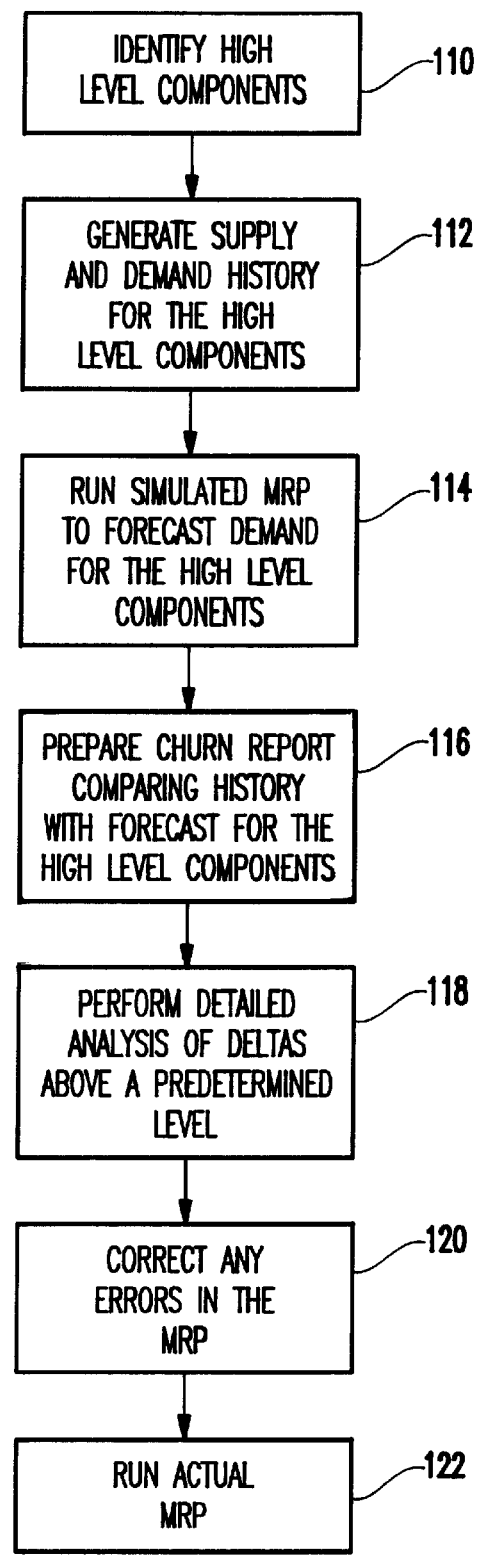
FIG. 1 is a flow diagram illustrating a preferred method of the invention.

FIG. 1 illustrates a simplified flowchart of the processing performed with the invention. In item 100, the invention identifies which components shall be classified as "high-level components". The invention allows the user to use any criteria to define high-level components. For example, the user could define high-level components as those which have a cost that exceeds a certain percentage of the cost of all components utilized in a given product. Alternatively, high-level components can be classified as one which is unique to the product in question and does not have ready substitutes or many alternative uses.

Therefore, the invention allows more precise purchasing control of exceptionally expensive components or those components which are unique to the product and are not easily substituted with the other products (and do not have many alternative uses). By concentrating on these components, the invention insures that sufficient quantities (and not excess quantities) of the unique/expensive components are purchased. This is more important for unique components because if errors are made with other components that are easily substituted between products, corrections for these purchasing errors can be corrected by simply substituting components between different products. To the contrary, if an excessive amount of unique components is purchased, these components may never be used (if the product is discontinued for example) resulting in waste. Similarly, the corporation may not be able to meet the demand for a given product if the unique components are not purchased in sufficient quantities. These problems are not as severe for components that can be easily substituted between different products.

As would be known by one ordinarily skilled in the art, the invention can perform the following analysis on all components, not just the high-level components. However, by limiting the invention to high-level components, the invention is able to operate more quickly and produce a shorter more readable report.

Low dollar, non-critical parts (non-high-level components), such as screws and nuts, etc. are like commodities and are normally highly available and low cost, in the market. The exposure for shortages and constraints on these types of items are very low risk, due to availability and cost.

In item 112, the invention generates the supply and demand history for the components. This history data includes information regarding how much of a specific component is purchased during a given time period and can include maximums, minimums, averages, etc. Then, in item 114, the invention runs the materials requirement planning tool in a simulated mode, which produces data regarding the number of each component that will be ordered (depending upon the sales forecasts and other similar information regarding the volume of different products that will be produced by the corporation). Current runs are saved and become history to do a compare with the next run or cycle.

In item 116, the invention produces the churn report based on a comparison of the demand history for each component with purchasing amounts produced by the simulated MRP. More specifically, the churn report (which is shown in greater detail in FIGS. 2 and 3) indicates when a component deviates from the historical data for that component. If the deviation matches the top level changes, it would normally be acceptable. However, if the lower level deviation does not match or the current deviation is not understood, it must be further analyzed or reviewed. Deviations which are not understood or match the highest level deviation, can indicate an MRP input error.

In item 118, the user of the churn report is directed to those components that have excessive deviations (high or low) from the historical data. In item 120, the user can correct any errors that are present in the MRP tool and run the actual MRP tool in item 122.

FIGS. 2 and 3 illustrates two different examples of the churn report the produced with the invention. More specifically, FIG. 2 is an example of the Churn report which compares base 11 (previous run, which is the history) to base 12 (current Run). The report depicts P/N 0000000N7281 as the critical item and compares (previous run vs current run) the item supply and demands in six individual monthly buckets showing deltas along with total volumes. P/N 0000000N7281 also pegs up to the highest level independent demand, which include top level machines and highest level independent card demands.

Figure 4:
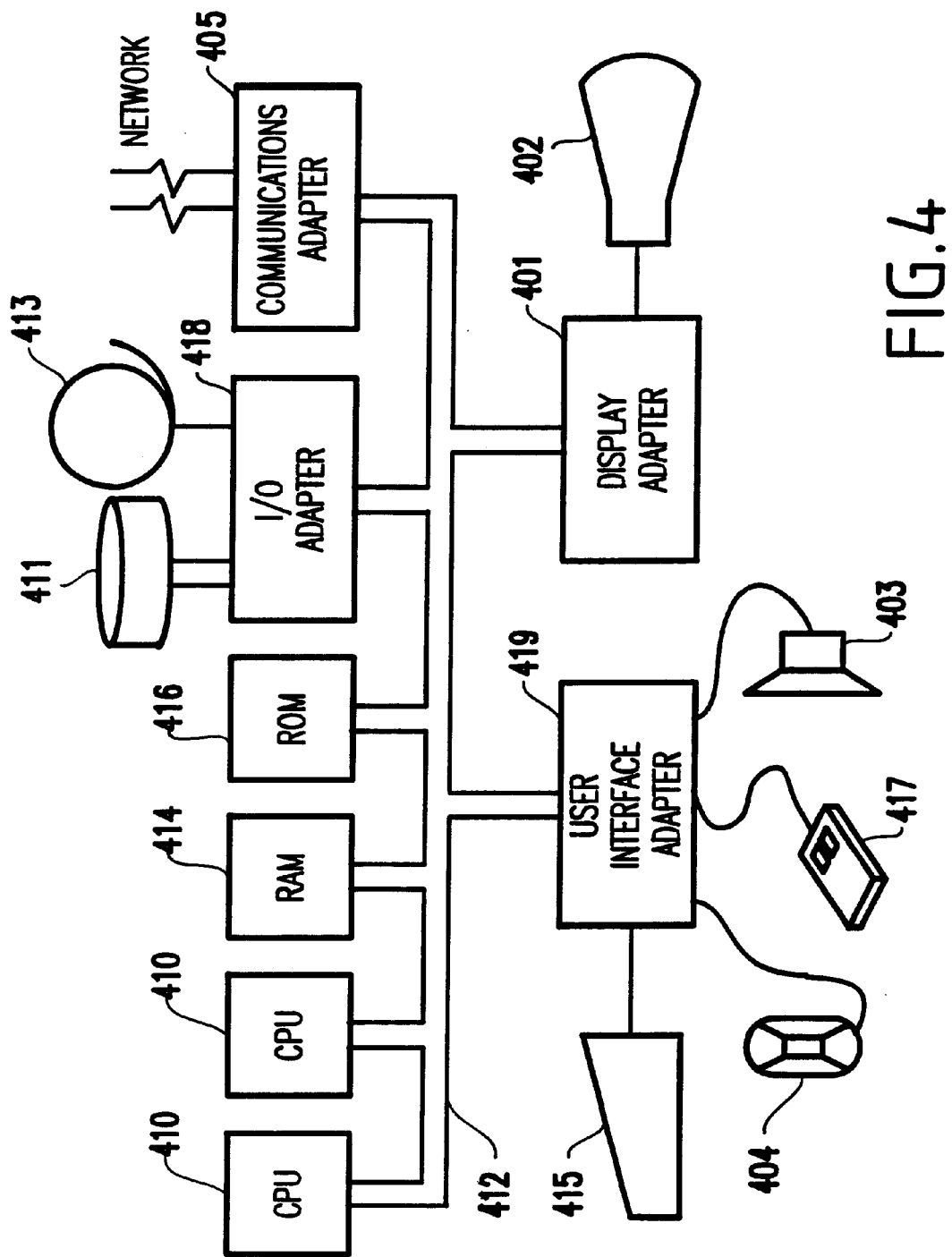
FIG. 4 is a schematic diagram of a hardware embodiment of the invention.

A representative hardware environment for practicing the present invention is depicted in FIG. 4, which illustrates a typical hardware configuration of an information handling/computer system in accordance with the subject invention, having at least one processor or central processing unit (CPU) 410. CPUs 410 are interconnected via system bus 412 to random access memory (RAM) 414, read-only memory (ROM) 416, an input/output (I/O) adapter 418 for connecting peripheral devices, such as disk units 411 and tape drives 413, to bus 412, user interface adapter 419 for connecting keyboard 415, mouse 417, speaker 403, microphone 404, and/or other user interface devices such as touch screen device (not shown) to bus 412, communication adapter 405 for connecting the information handling system to a data processing network, and display adapter 401 for connecting bus 412 to display device 402. A program storage device readable by the disk or tape units, is used to load the instructions which perform the foregoing simulation analysis application also loaded onto the computer system.

Thus, the invention compares the MRP simulation against historical component purchasing requirements. If the purchasing requirements for a given component deviate from the historical requirements for that component by more than a predetermined amount, the invention automatically marks the purchasing requirement for that component as being abnormal. With the invention, only those components that deviate from their historical purchasing history need to be analyzed manually. In addition, in one embodiment, the invention limits the automatic review to only high-level components. High-level components are those which have a relative cost that exceeds a predetermined percentage of the product being manufactured. Therefore, with the invention, manual analysis only occurs for high-level components that have an abnormal purchasing requirement which deviates significantly from historical purchasing requirements. This substantially increases efficiency by reducing the manual effort required to check the validity of a MRP simulation. In addition because of the automated nature, the invention is more consistent and more accurate than the manual system.

This invention is used to improve the data quality of an MRP tool. It is through this invention that the data and churn can be better understood and validated prior to the live execution of a MRP run for P/N demands. This tool enhances customer serviceability, by improving component availability and reducing part shortages. It also reduces inventory overages caused by planning errors (input errors). This invention would benefit any MRP environment by improving data integrity which directly impacts inventory dollars and customer serviceability.

While the invention has been described in terms of preferred embodiments, those skilled in the art will recognize that the invention can be practiced with modification within the spirit and scope of the appended claims.

What is claimed is:

1. A method of checking the accuracy of a materials requirements planning (MRP) tool comprising:
    running a simulation using said MRP tool for at least one preselected component to produce simulated order levels for said preselected component;
    automatically identifying deviations of said simulated order levels from historical order levels for said preselected component; and
    analyzing only said deviations.

2. The method in claim 1, further comprising identifying high-level components and performing said method only on said high-level components.

3. The method in claim 2, wherein said high-level components comprise components having a cost exceeding a predetermined percentage of the total cost of a product made with said components.

4. The method in claim 2 wherein said high-level components comprise components that are uniquely used in a limited number of products.

5. The method in claim 1, wherein said deviations comprises a simulated order level that is above or below said historical order levels by at least a predetermined amount.

6. The method in claim 1, wherein said preselected component comprises a plurality of different components and said identifying produces a listing of ones of said components that have said deviations.

7. The method in claim 1, wherein said historical order levels comprise amounts of said preselected component ordered in previous time periods.

8. A method of checking the accuracy of a materials requirements planning (MRP) tool comprising:
    identifying high-level components used to manufactured products;
    running a simulation using said MRP tool for said high-level components to produce simulated order levels for said high-level components;
    automatically identifying deviations of said simulated order levels from historical order levels for said high-level component; and
    analyzing only said deviations.

9. The method in claim 8, wherein said high-level components comprise components having a cost exceeding a predetermined percentage of the total cost of a product made with said components.

10. The method in claim 8, wherein said high-level components comprise components that are uniquely used in a limited number of products.

11. The method in claim 8, wherein said deviations comprises a simulated order level that is above or below said historical order levels by at least a predetermined amount.

12. The method in claim 8, wherein said indenting produces a listing of ones of said high-level components that have said deviations.

13. The method in claim 8, wherein said historical order levels comprise amounts of said high-level components ordered in previous time periods.

14. A method of checking the accuracy of a materials requirements planning (MRP) tool comprising:
    running a simulation using said MRP tool for preselected components to produce simulated order levels for said preselected components;
    automatically identifying deviations of said simulated order levels from historical order levels for said preselected component;
    producing a listing of ones of said components that have said deviations; and
    analyzing only said deviations.

15. The method in claim 14, further comprising identifying high-level components and performing said method only on said high-level components.

16. The method in claim 15, wherein said high-level components comprise components having a cost exceeding a predetermined percentage of the total cost of a product made with said components.

17. The method in claim 15, wherein said high-level components comprise components that are uniquely used in a limited number of products.

18. The method in claim 14, wherein said deviations comprises a simulated order level that is above or below said historical order levels by at least a predetermined amount.

19. The method in claim 14, wherein said historical order levels comprise amounts of said preselected component ordered in previous time periods.

20. A program storage device readable by machine, tangibly embodying a program of instructions executable by the machine to perform a method of checking the accuracy of a materials requirements planning (MRP) tool said method comprising:
    running a simulation using said MRP tool for at least one preselected component to produce simulated order levels for said preselected component;
    automatically identifying deviations of said simulated order levels from historical order levels for said preselected component; and
    analyzing only said deviations.

21. The program storage device in claim 20, wherein said method further comprises identifying high-level components and performing said method only on said high-level components.

22. The program storage device in claim 21, wherein said high-level components comprise components having a cost exceeding a predetermined percentage of the total cost of a product made with said components.

23. The program storage device in claim 21, wherein said high-level components comprise components that are uniquely used in a limited number of products.

24. The program storage device in claim 20, wherein said deviations comprises a simulated order level that is above or below said historical order levels by at least a predetermined amount.

25. The program storage device in claim 20, wherein said preselected component comprises a plurality of different components and said identifying produces a listing of ones of said components that have said deviations.

26. The program storage device in claim 20, wherein said historical order levels comprise amounts of said preselected component ordered in previous time periods.

* * * * *